(12) United States Patent
Robare et al.

(10) Patent No.: US 6,278,939 B1
(45) Date of Patent: Aug. 21, 2001

(54) METHOD AND SYSTEM FOR PROVIDING DATA FROM A REMOTELY LOCATED GEOGRAPHIC DATABASE FOR USE IN NAVIGATION SYSTEM UNITS

(75) Inventors: Philip Robare, Chicago; William Gale, Oak Park, both of IL (US)

(73) Assignee: Navigation Technologies Corp., Rosemont, IL (US)

( * ) Notice: Subject to any disclaimer, the term of this patent is extended or adjusted under 35 U.S.C. 154(b) by 0 days.

(21) Appl. No.: 09/624,694

(22) Filed: Jul. 24, 2000

(51) Int. Cl.[7] .......................... G01C 21/00; G01S 13/00; G06G 7/00; G06G 17/00; G06G 19/00

(52) U.S. Cl. ................................ 701/208; 701/200–207; 701/209-217; 701/117; 701/118; 701/119; 342/357; 342/357.08; 342/357.13; 342/357.01; 342/457; 345/439; 345/472; 345/133; 345/142; 707/100; 707/104; 707/200; 364/443; 364/444; 364/445; 364/449; 364/450; 364/448

(58) Field of Search ....................................... 701/200–217, 701/117, 118, 119; 340/990, 989, 998, 995, 988, 901; 342/357, 457, 357.01, 357.13, 357.08; 345/133, 145, 439, 472; 707/100, 104, 200; 364/444, 445, 447, 448, 449, 450, 443

(56) References Cited

U.S. PATENT DOCUMENTS

| 5,220,507 | * | 6/1993 | Kirson | 364/444 |
| 5,247,356 | | 9/1993 | Ciampa | 358/109 |
| 5,359,529 | * | 10/1994 | Snider | 364/449 |
| 5,488,559 | * | 1/1996 | Seymore | 364/449 |
| 5,517,419 | | 5/1996 | Lanckton et al. | 364/449 |
| 5,559,707 | | 9/1996 | DeLorme et al. | 364/443 |
| 5,808,566 | | 9/1998 | Behr et al. | 340/995 |
| 5,938,720 | * | 8/1999 | Tamai | 701/209 |
| 5,948,040 | * | 9/1999 | DeLorme et al. | 701/201 |
| 5,953,722 | * | 9/1999 | Lampert et al. | 707/100 |
| 5,954,419 | * | 10/1999 | Ashby | 707/100 |
| 6,011,494 | * | 1/2000 | Watanabe et al. | 340/995 |
| 6,038,559 | * | 3/2000 | Ashby et al. | 707/4 |
| 6,049,755 | * | 4/2000 | Lou et al. | 701/207 |
| 6,161,071 | * | 12/2000 | Shuman et al. | 701/48 |
| 6,163,748 | * | 12/2000 | Guenther | 701/202 |
| 6,175,803 | * | 1/2001 | Chowanic et al. | 701/209 |
| 6,184,823 | * | 2/2001 | Smith et al. | 342/357.13 |
| 6,185,503 | * | 2/2001 | Sumizawa | 701/209 |

FOREIGN PATENT DOCUMENTS

0816802-A2 * 1/1998 (EP).

* cited by examiner

Primary Examiner—William A. Cuchlinski, Jr.
Assistant Examiner—Ronnie Mancho
(74) Attorney, Agent, or Firm—Frank J. Kozak; Lawrence M. Kaplan

(57) ABSTRACT

A navigation system and method in which geographic data are transmitted in portions, as needed, to end users' computing platforms from a central geographic database and used by the end users' computing platforms to provide navigation-related features to end users as the end users travel along roads in a geographic region. Each portion of data transmitted to each end user includes (a) data that represent road portions located in proximity to the road portion upon which the end user is located and that have a same rank as the road portion upon which the end user is located and (a) data that represent road portions having ranks other than the rank of the road portion upon which the end user is located but that are accessible within a predetermined threshold by vehicle from the road portions located in proximity to the road portion upon which the end user is located that have the same rank as the road portion upon which the end user is located, wherein a rank of a road corresponds to a classification such that roads having a higher rank are traversable generally faster and carry generally higher volumes of traffic than roads of a lesser rank.

34 Claims, 12 Drawing Sheets

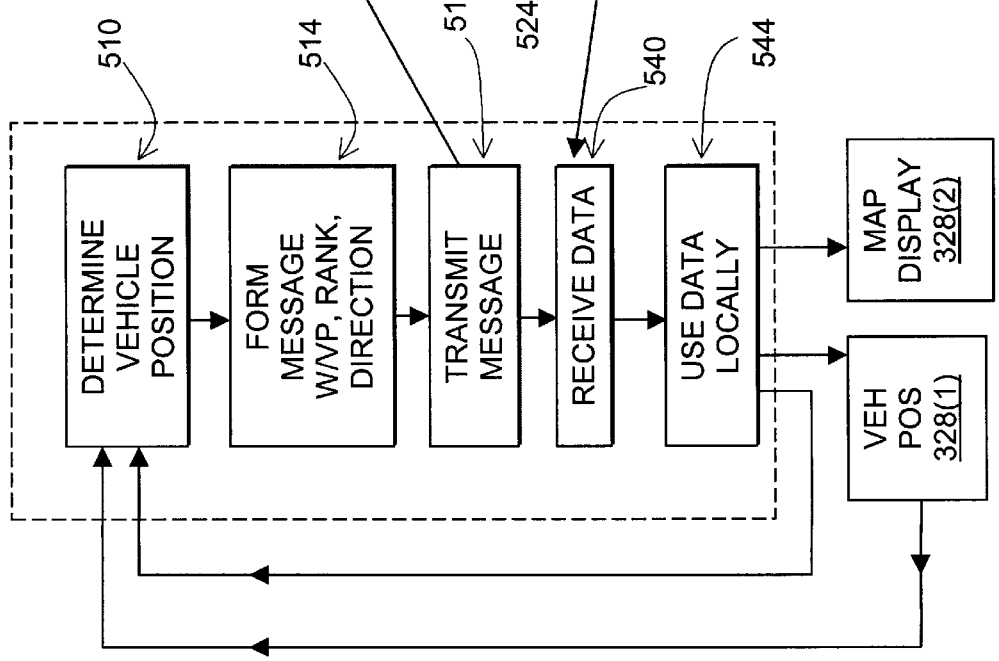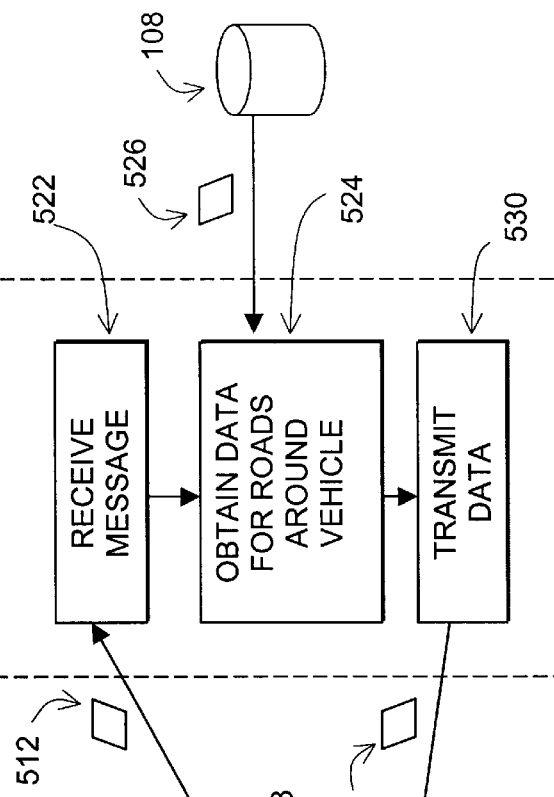
FIG. 7

METHOD AND SYSTEM FOR PROVIDING DATA FROM A REMOTELY LOCATED GEOGRAPHIC DATABASE FOR USE IN NAVIGATION SYSTEM UNITS

REFERENCE TO RELATED APPLICATION

The present application is related to the copending application entitled "METHOD AND SYSTEM FOR FORMING A DATABASE OF GEOGRAPHIC DATA FOR DISTRIBUTION TO NAVIGATION SYSTEM UNITS" filed on even date herewith, Attorney Docket No. N0055US, the entire disclosure of which is incorporated by reference herein.

BACKGROUND OF THE INVENTION

The present invention relates to navigation systems and more particularly, the present invention relates to the delivery of geographic data to navigation system units from a remotely located central geographic database.

Navigation systems provide various useful features, such as calculating routes to desired destinations, providing guidance for following calculated routes, displaying maps, and so on. In order to provide these various kinds of useful features, a navigation system uses geographic data. There are various computer architectures for navigation systems that use geographic data to deliver navigation-related and map-related features. In one type of architecture for a navigation system, end users (such as vehicle drivers) have navigation system units in their vehicles. These end users' navigation system units obtain data from a remotely located geographic database. The remotely located geographic database contains a relatively large amount of geographic data. A server associated with the remotely located geographic database handles requests for navigation-related or map-related services from end users' navigation system units. When an end user's navigation system unit requests data, the server accesses the remotely located geographic database associated therewith to obtain the necessary data to respond to the request and then sends the data to the requesting end user's navigation system unit.

This type of navigation system architecture provides several advantages. One advantage relates to providing updated geographic data. There is a continuing need to update the geographic data used by a navigation system. For example, new streets are built, road construction closes roads, detours are established, new businesses open, posted speed limits change, new turn restrictions are established at intersections, streets are renamed, and so on. These kinds of changes can affect travel through a geographic area. Accordingly, the geographic data used by a navigation system should be updated on a regular basis in order to accurately reflect changes in the represented geographic features. A computer architecture in which individual navigation system units obtain geographic data from a single central geographic database affords an advantage with respect to the updating of the geographic data. With a computer architecture in which individual navigation system units obtain data from a single geographic database associated with a central server, updates need to be applied only to the central database.

A consideration to be addressed in a navigation system in which data are transmitted from a central geographic database to end users' navigation system units relates to the selection of data to be transmitted. If large amounts of data are sent to an end user's navigation system unit, the unit may require significant memory or data storage resources in order to handle the large amounts of data. Also, if large amounts of data are sent to each end user's navigation system unit, the communications system used to carry these data has to have a corresponding large capacity. On the other hand, if the end user's navigation system unit does not receive sufficient data or appropriate data, the end user's navigation system unit may not be able to provide the desired function, such as the displaying a map of the roads around the end user's position. Accordingly, in a navigation system in which data are transmitted from a central geographic database to end users' navigation system units, there is a need to send all the data that may be needed on an end user's system but not to send data that would not be needed.

SUMMARY OF THE INVENTION

To address these and other objectives, the present invention comprises a navigation system and method in which geographic data are transmitted in portions, as needed, to end users' computing platforms from a central geographic database and used by the end users' computing platforms to provide navigation-related features to end users as the end users travel along roads in a geographic region. Each portion of data transmitted to each end user includes (a) data that represent road portions located in proximity to the road portion upon which the end user is located and that have a same rank as the road portion upon which the end user is located and (a) data that represent road portions having ranks other than the rank of the road portion upon which the end user is located but that are accessible within a predetermined threshold by vehicle from the road portions located in proximity to the road portion upon which the end user is located that have the same rank as the road portion upon which the end user is located, wherein a rank of a road portion corresponds to a classification of the road of which the road portion is a part such that roads having a higher rank are traversable generally faster and carry generally higher volumes of traffic than roads of a lesser rank.

BRIEF DESCRIPTION OF THE DRAWINGS

FIG. 7 is a flow chart showing the steps performed by the navigation system unit of FIG. 6 to obtain geographic data from the navigation services server.

DETAILED DESCRIPTION OF THE PRESENTLY PREFERRED EMBODIMENTS

I. OVERVIEW OF NAVIGATION SYSTEM

Figure 1:
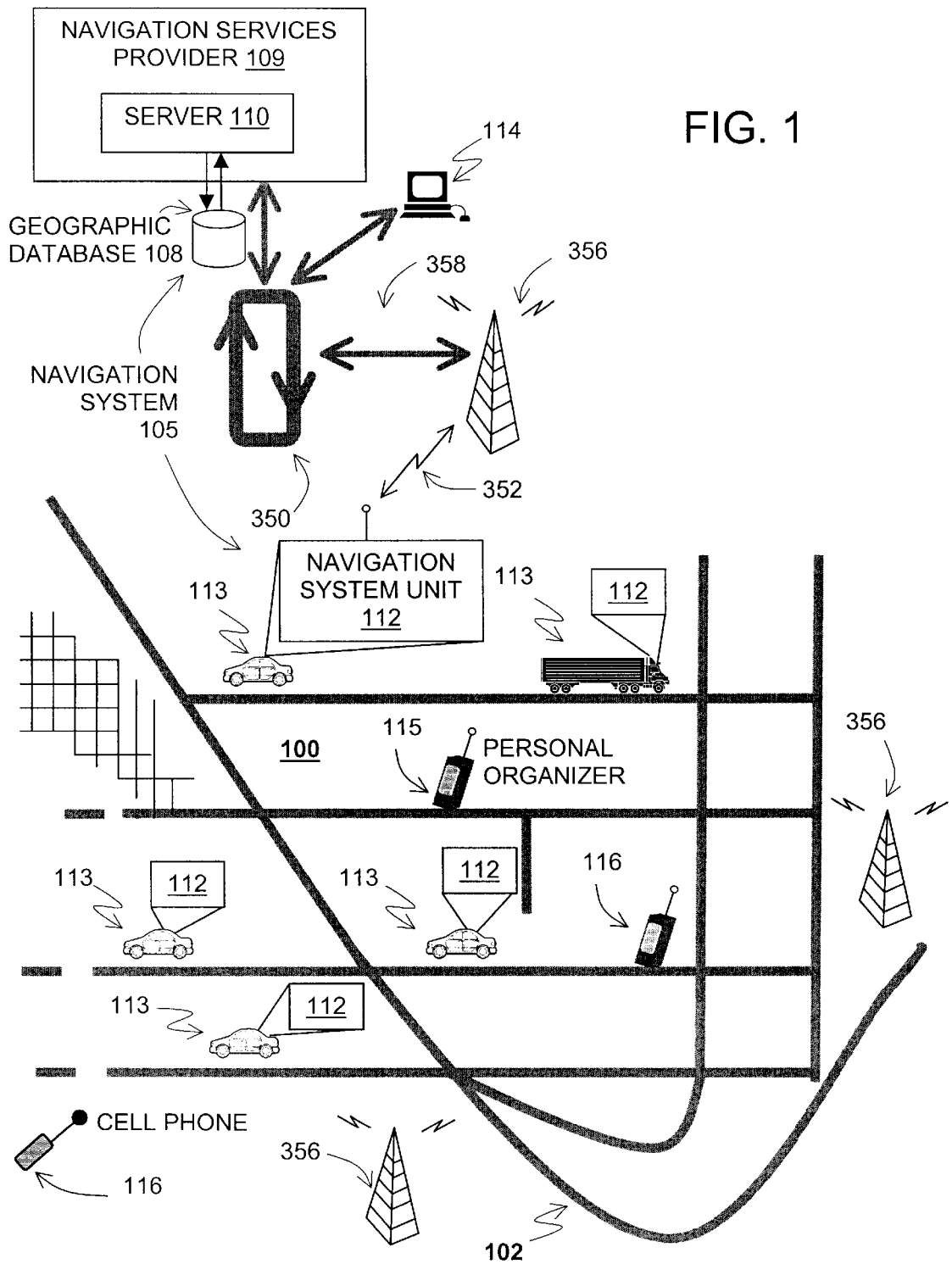
FIG. 1 is an illustration of a geographic area which is served by a navigation system that transmits geographic data to end users' portable navigation system units.

FIG. 1 is a diagram illustrating a geographic region 100. The geographic region 100 may correspond to a metropolitan or rural area, a state, a country, or combinations thereof. Located in the geographic region 100 is a road network 102. A navigation system 105 is located in the geographic region 100. The navigation system 105 is used by end users (e.g., vehicle drivers and passengers, as well as other persons) to obtain navigation-related and map-related features with respect to the geographic region 100. The navigation-related and map-related features include information about travel along the road network 102.

The navigation system 105 includes a geographic database 108. The geographic database 108 is maintained and operated by a navigation services provider 109. The navigation services provider 109 uses data from the geographic database 108 to provide navigation-related and map-related features to the end users. The end users use various computer platforms to request and obtain navigation-related and map-related features and geographic data from the navigation services provider 109. These various platforms may include navigation system units 112 located in vehicles 113, personal computers 114, personal organizers 115, portable phones 1 16, or any other types of computing devices that have the appropriate hardware and software to access the navigation services provider 109 over a data network.

According to the embodiment of FIG. 1, some of the navigation-related and map-related services obtained by end users from the navigation services provider 109 include route calculation, route guidance, map display, point of interest searching, destination selection, and so on. When an end user accesses the navigation system 105 to 11 obtain navigation-related services, certain functions may be performed remotely (i.e., away from the computing platform being used by the end user). For example, when an end user accesses the navigation services provider 109 to obtain route guidance for driving a vehicle to a destination, a route to the destination may be calculated remotely on the navigation server 110 operated by the navigation services provider 109. When performing the function of calculating a route, the navigation server 110 may use data from the geographic database 108. Then, data describing the route are downloaded to the end user's computing platform. The data describing the route may include a list of the road segments in the route, maneuvering instructions for following the route, and graphical maps that can be displayed on the end user's computing platform. The data describing the route may be downloaded all at once or may be downloaded a portion at a time as the end user travels along the route. The end user's computing platform (e.g., a navigation system unit in the end user's vehicle) uses the downloaded data to provide the end user with driving instructions, graphical maps, and so on. In order to provide the end user with driving instructions and graphical maps at appropriate times and locations while traveling along the route, the end user's computing platform may determine the position of the end user's vehicle relative to the data describing the route that had been downloaded from the navigation services provider 109. The function of determining the vehicle's position relative to the route may be performed locally by the end user's computing platform using the data that had been downloaded from the navigation services provider 109.

In addition to downloading data describing the route, it is preferable that the end user receive additional data describing some of the roads around the route. This additional data can be used in case the end user departs from the route either intentionally or unintentionally.

II. FORMATION OF GEOGRAPHIC DATABASE

Because geographic data are used in certain known and expected ways to perform known navigation-related and map-related functions, the data in the geographic database 108 can be organized and arranged to facilitate the performance of these functions. As an example, the data in the geographic database 108 can be organized into separate subsets or types based upon the navigation-related or map related function being performed. Each subset of the geographic data would include the data and associated attributes required to perform a particular navigation function but would exclude data and attributes which are not needed to perform the function.

In addition, the geographic database 108 may be organized and arranged to facilitate the performance of certain functions remotely (e.g., on the navigation server 110) and the performance of other functions locally (e.g., on the end user's computing platform). Because certain functions are performed locally (i.e., on the end user's computing platform), the geographic database 108 can be arranged and organized to facilitate the downloading of data in portions as needed to end users' computing platforms to perform certain navigation-related functions locally.

Figure 2:
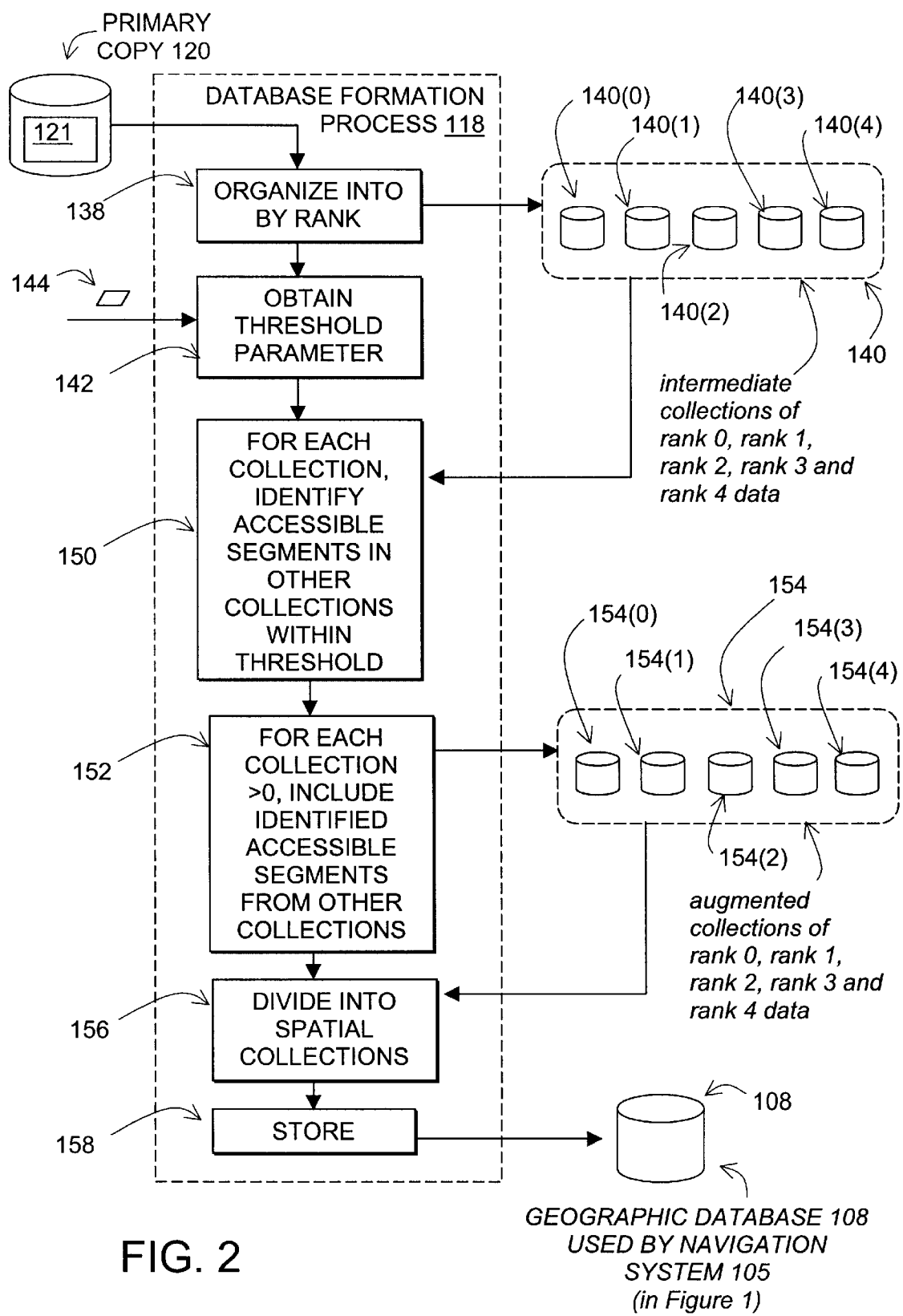
FIG. 2 is a flow chart showing a process for forming the geographic database used in the navigation system of FIG. 1.

FIG. 2 shows a process 118 for forming part or all the geographic database 108 in FIG. 1. In particular, the process 118 is used to form the portion of the geographic database 108 that contains data which are downloaded to end users' computing platforms to perform certain navigation-related or map-related functions locally (i.e., on the end user's computing platform). The geographic database 108 may also contain other portions (or refer to related databases) that are used to perform certain other navigation-related functions remotely (i.e., on the navigation server 110 operated by the navigation services provider 109 in FIG. 1).

In FIG. 2, the process 118 uses a primary copy 120 of a geographic database to form the geographic database 108 which is used by the navigation system 105 in FIG. 1. Although the geographic database 108 used by the navigation system 105 contains some of the same data which are contained in the primary copy 120 of the geographic database, the geographic database 108 has a different construction than the primary copy 120. The geographic database 108 is organized and arranged in a manner that facilitates its use for providing navigation-related services. In particular, the geographic database 108 is organized and arranged in a manner that facilitates its use in a navigation system in which separate computing platforms operated by end users obtain geographic and other navigation-related data from a remotely-located central database that transmits geographic and other navigation-related data, as needed, to the separate computing platforms.

The process 118 of FIG. 2 is performed by an entity (e.g., an organization, person or company) that wishes to form the geographic database 108. For example, the process 118 may be performed by a database developer or by the entity that operates or maintains a central database of geographic data and that provides navigation services to navigation system units from the central database as needed.

In FIG. 2, the primary copy 120 contains data 121 that represent all the roads in a covered geographic region. The geographic region may correspond to the geographic region 100 of FIG. 1, which may be a metropolitan or rural area, a state, a country, or combinations thereof. The primary copy 120 of the geographic database is updated, expanded, and/or otherwise modified on a regular and continuing basis. In one embodiment, the geographic data 121 are collected, updated, and expanded by Navigation Technologies Corporation of Rosemont, Illinois.

To facilitate the updating, expanding and modifying of the data 121 in the primary copy 120, the primary copy of the geographic database may be maintained in a format that facilitates updating and development. For example, the data in the primary copy 120 may be stored in an uncompressed format. In the primary copy of the geographic database 120, each portion of a road may be represented by a separate road segment data The data 121 contained in the primary copy 120 include various attributes of the represented roads. These attributes may include data indicating locations (i.e., intersections as well as other points) along each of the roads, the names of each of the roads, highway designations of each road, address ranges along each road segment, speed limits or speed categories along the roads, turn restrictions at intersections, and so on.

Each road (and segment thereof) represented in the primary copy 120 of the geographic database is associated with a rank. A rank of a road refers to a functional classification of the road. Roads that permit generally higher speeds and that allow greater volumes of traffic are assigned higher ranks than roads that permit lower speeds and lesser volumes of traffic. For example, roads having a rank of "4" include high volume, controlled access roads, such as expressways and freeways. Roads having a rank of"3" may be high volume roads with few speed changes, but are not necessarily controlled access roads. The lower ranked roads handle corresponding lower volumes and generally have more speed changes or slower speeds. Roads having a rank of "0" can handle the lowest volumes. For example, these lowest ranked roads may include side streets, alleyways, etc. The rank of a road may be determined by the geographic database developer when the data representing the road are collected and added to the primary copy of the geographic database. In alternative embodiments, the roads in a region may be assigned more or fewer than five ranks.

Figure 3:
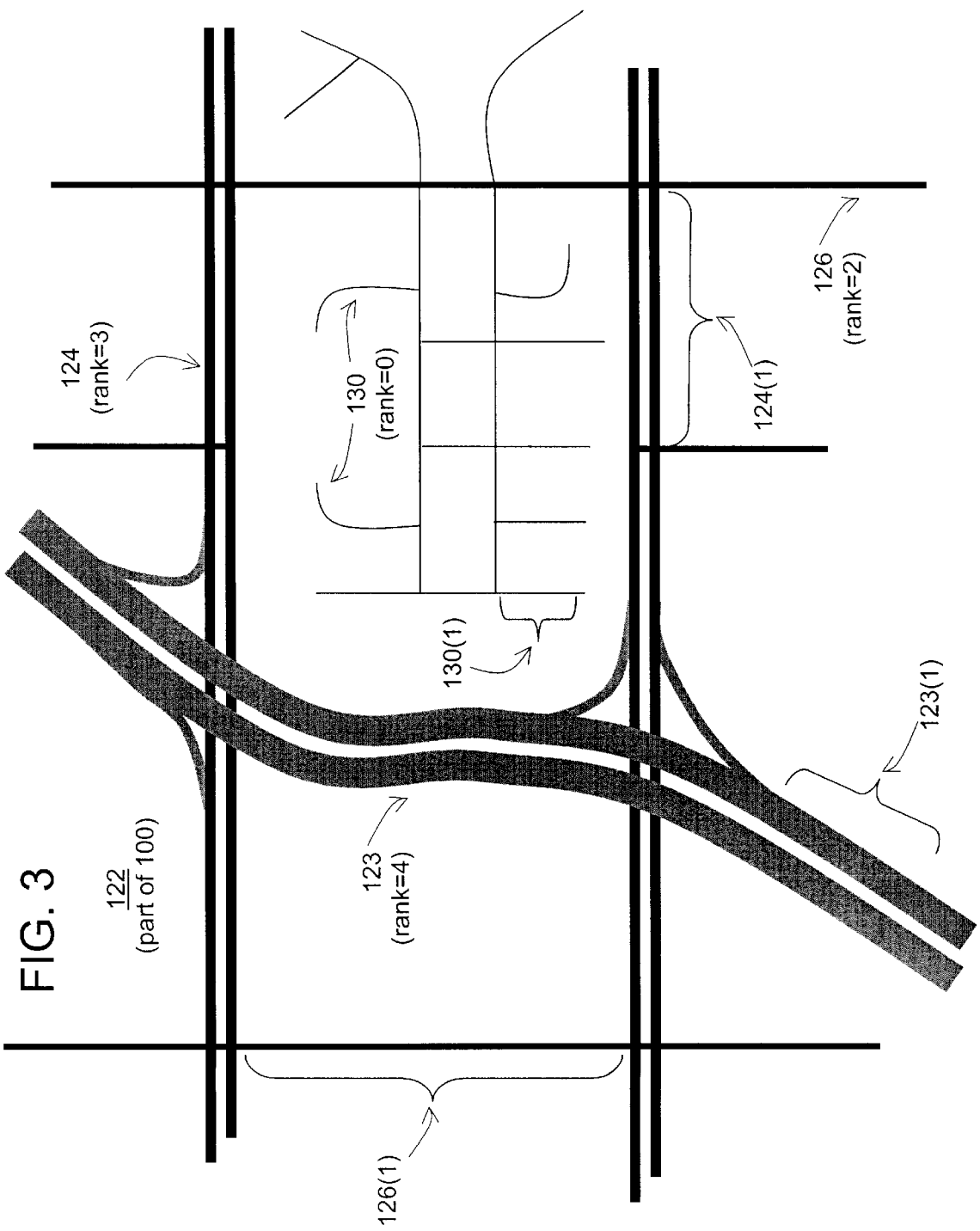
FIG. 3 is a map of a portion the geographic region of FIG. 2 illustrating functional classes of roads.

FIG. 3 shows a map 122 of a portion of the geographic region represented by the primary copy 120 of the geographic database. Each segment of each road between intersections shown in FIG. 3 is represented by a data entity in the geographic database 120 in FIG. 2. For example, the portions 123(1), 124(1), 126(1), and 130(1), are represented by separate road segment data entities.

In FIG. 3, the map 122 shows roads of different ranks. As shown in FIG. 3, a controlled access road 123 is assigned a rank of "4." A major, high volume road 124 has a rank of "3." A road 126 with businesses located along it has a rank of "2", and so on. Residential side streets and alleys 130 have a rank of "0."

In FIG. 2, the primary copy 120 of the geographic database includes data that indicate the rank of each represented road segment. The database formation process 118 in FIG. 2 includes a step 138 in which the data 121 representing roads are organized into separate intermediate collections 140 based upon rank. Each separate intermediate collection 140 is comprised of data entities that represent roads. The rank of a road segment is used to determine in which of the separate intermediate collections 140 the data representing the road segment is included. For example, five separate intermediate collections of the data, e.g., 140(0), 140(1), 140(2), etc., may be formed. The intermediate collection 140(0) contains only the data that represent roads having a rank of 0, the intermediate collection 140(1) contains only the data that represent the roads having a rank of 1, and so on. Each of these separate intermediate collections 140 may be stored temporarily in a separate file.

The process 118 includes a step 142 in which a threshold parameter 144 is specified. The threshold parameter 144 is preferably specified as a time. In alternative embodiments, the threshold parameter 144 may be specified as a distance, a combination of time and distance, a fixed value or a calculated value. The threshold parameter is specified by the entity, e.g., a database developer, using the process 118 to form the database 108. In the embodiment of FIG. 2, the threshold parameter 144 is specified as a unit of time. The value chosen for the threshold parameter corresponds to an estimated amount of time between successive downloads of data from a central database to a mobile navigation system unit with sufficient extra time added to ensure that the mobile navigation system has all the data needed to perform its functions. In one embodiment, the threshold parameter is selected to be 30 seconds, although other values may be used.

The process 118 includes a step 150 that identifies—for all the roads represented in each given intermediate collection 140—those portions of roads represented by data in other intermediate collections (i.e., road of other ranks) that are accessible from the roads represented by data in the given intermediate collection up to a distance related to the driving time of the threshold parameter 144. A road from another intermediate collection 140 is accessible from a road of a given intermediate collection 140 if the road of the other intermediate collection can be entered from the road of the given intermediate collection by a legal driving maneuver. In other words, with respect to all the roads of a given rank, those portion of roads of other ranks than can be reached from any road of the given rank within a distance related to the driving time of the threshold parameter are identified. Typically, a road of another rank is accessible from a road of a given rank when the road of the other rank forms an intersection with the road of the given rank and can be entered from the road of the given rank by a legal driving maneuver.

As an example, with respect to the roads represented in the intermediate collection 140(2) (i.e., all the roads having a rank of 2), the portions of roads having rank 0, rank 1, rank 3, and rank 4 that are accessible via a valid driving maneuver from a rank 2 road within a driving time of the threshold parameter are identified. If the threshold parameter is "30 seconds", then those portions of roads having rank 0, rank 1, rank 3, and rank 4 that are accessible within 30 seconds of driving time from a rank 2 road are identified. The portions of these roads of rank 0, rank 1, rank 3 and rank 4 that are accessible within 30 seconds of driving time is determined by taking into account the legal speed limits associated with these roads. For example, a rank 0 road may have a speed limit of 20 miles per hour. Therefore, the portion of a rank 0 road that is accessible from the rank 2 road extends 1,760 feet. Alternatively, a rank 4 road may have a speed limit of 60 miles per hour and therefore the portion of the rank 4 road that is accessible from the rank 2 road extends 1 mile. If the geographic database represents speed limits along roads by speed limit categories instead of actual speed limit values, the portions of roads of that are accessible within 30 seconds of driving time is determined by taking into account the upper limits of the ranges associated with the applicable speed limit categories associated with these roads. (Adjustments may be included to account for estimated times to make turns, etc.)

When the portions of roads of other ranks that are accessible from a road of a given rank are determined, the portions are identified in whole segments. As an example, assume that a rank 0 road segment can be accessed from an intersection with a rank 2 road segment. Also assume that the rank 0 road segment represented by a single road segment data entity. Further assume that the distance related to the driving time of the threshold parameter is 1760 feet. In this example, the entire rank 0 road segment is identified as being accessible from the rank 2 road segment because the entire distance associated with the driving time of the threshold is encompassed within the single whole road segment.

It may occur that more than one road segment represented by data in another intermediate collection (i.e., a road segment of another rank) is accessible within the distance related to the driving time of the threshold parameter from a road segment represented by data of a given intermediate collection (i.e., a road segment of the rank associated with the given collection). This may occur when the length of the road segment of the other rank that connects to the road segment of the given rank is less than the distance associated with the driving time of the threshold parameter. For example, assume that a rank 0 road segment is 1000 feet long and is accessible from an intersection with a rank 2 road. Further assume that the distance related to the driving time of the threshold parameter is 1760 feet. In this case, the successor segments of the rank 0 road segment are identified as being within the threshold. If necessary, additional successors may be identified so that all the (whole) road segments of ranks other than the given rank that are accessible within the distance related to the driving time of the threshold parameter are identified.

The process 118 then includes a step 152 in which augmented collections 154 of data are formed. A separate augmented collection 154 is formed from each of the intermediate collections 140 of data that represent roads of a separate rank. An augmented collection 154 is formed by adding the data entities that represent the road segments that include the portions of roads of other ranks that had been identified in the previous step (i.e., step 150). In the embodiment of FIG. 2, five separate augmented collections of data, i.e., 154(0), 154(1), 154(2), 154(3), and 154(4), are formed, one from each of the intermediate collections 140(0), 140(1), 140(2), 140(3), and 140(4), respectively. As a result of the step 152, the data entities identified in step 150 (i.e., the data entities that represent the portions of roads of other ranks that are accessible from roads of a given rank) are now contained in multiple augmented collections. Each of the data entities identified in the step 150 is contained in the augmented data collection associated with its native rank as well as in another augmented data collection associated with another rank.

After the separate augmented collections of data entities are formed, the process 118 includes a step 156 in which the data are organized spatially. In the process 118 of FIG. 2, each augmented collection 154 is separately spatially organized. In general, when geographic data are organized spatially, geographic features that are close together physically in the geographic region are represented by data records that are physically (or logically) close together in the database and possibly also close together on the medium upon which the data are stored. There are various methods by which data that represent geographic features can be organized spatially. One of the ways that geographic data can be organized spatially is to first identify groups of data entities that represent geographic features that are located close together and then arrange the groups spatially. The data entities within each group may also be organized spatially or the data entities within a group may be organized according to another arrangement.

There are a number of different procedures that can be used for forming groups of spatially organized geographic data. For example, a simple method may provide for separating the geographic data into a plurality of groups (or parcels) wherein the data in each group represent features encompassed within a separate one of a plurality of regular sized rectangles which together form a regular, rectangular grid over the geographic region. Another method for forming parcels is to organize into separate parcels the data that represent physical geographic features encompassed within separate rectangular areas where each of the rectangular areas is formed by a bisection of rectangles encompassing parts of the region until a parcel size below a maximum threshold is obtained. In addition, parcelization procedures are disclosed in the patents, U.S. Pat. Nos. 5,968,109 and 5,974,419, the entire disclosures of which is incorporated by reference herein.

Figure 4:
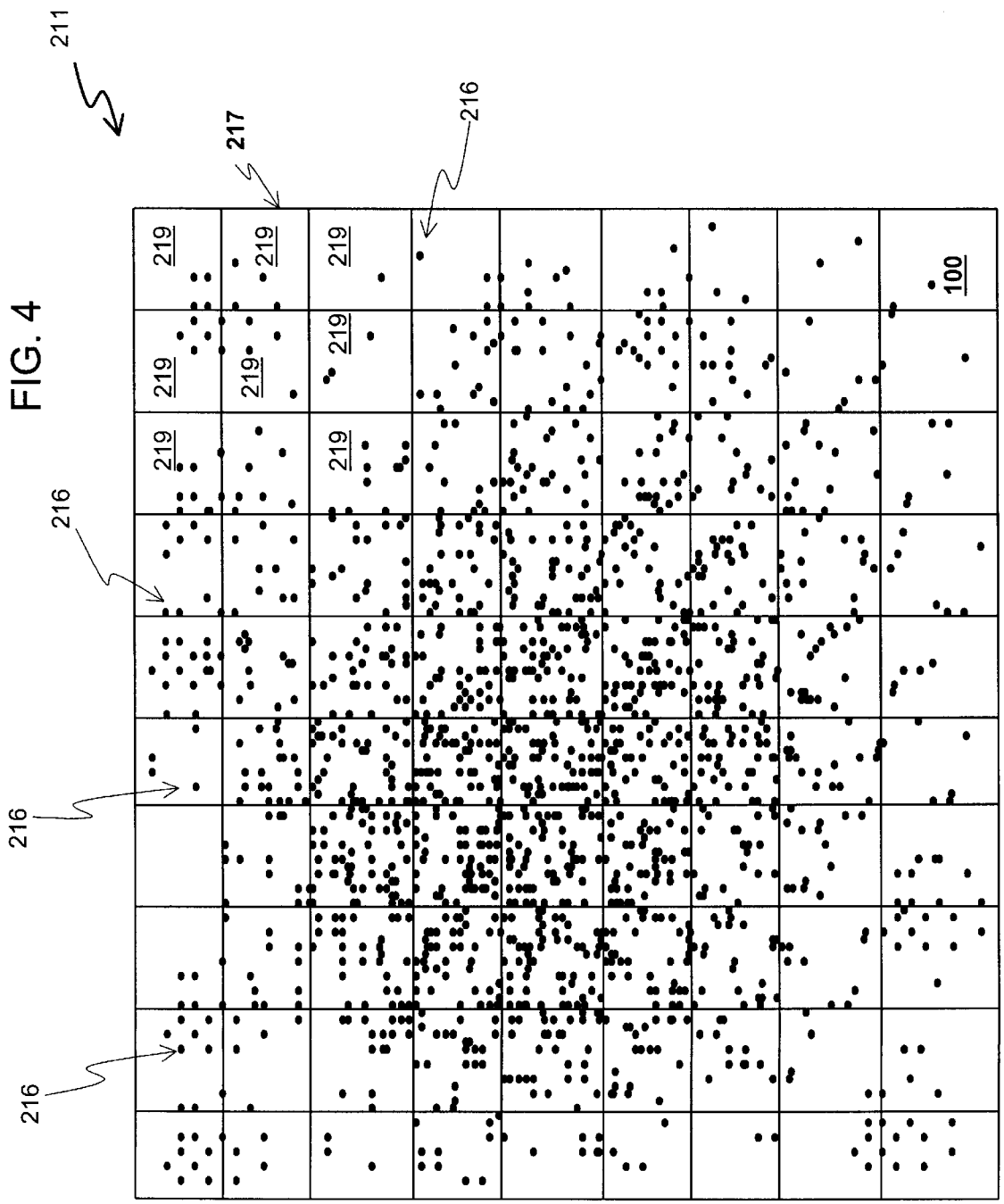
FIG. 4 is a map used to illustrate the step in the process of FIG. 3 of organizing geographic data spatially.

Parcelization of spatially organized data is illustrated with reference to FIGS. 4 and 5. FIG. 4 shows a map 211 of the geographic region 100. A plurality of positions 216 (represented by the dots or points) are shown to be located on the map 211. Each of the positions 216 represents a place or point in the geographic area 100 at which there is located a feature about which information is included in the geographic database 108 of FIG. 1. For example, the positions 216 may correspond to the physical locations of end points of road segments, points along road segments, points-of-interest (such as hotels, civic centers, etc.), and so on, which are represented by the data in the geographic database 108. Each of these locations 216 has a unique physical location (latitude, longitude, and optionally absolute or relative altitude) and each of the locations 216 can be uniquely identified by its two dimensional (or three dimensional) geographic coordinates (i.e., latitude, longitude, and optionally altitude).

In FIG. 4, a grid 217 overlays the geographic region 100 represented by the map 211. The grid 217 divides the geographic region 100 into a plurality of rectangular areas 219. These rectangular areas 219 may be all the same size or may have different sizes depending upon the procedure used for parcelization. The grid lines of the grid 217 represent the boundaries of the rectangular areas 219. The locations of the boundaries may depend on the parcelization procedure used. In general, when using any of the procedures for spatial parcelization, the data records of a particular type of data which represent features that are encompassed within each rectangular area 219 are grouped together in a separate parcel 225 (in FIG. 5) of data. Therefore, each parcel 225 of spatially organized data (in FIG. 5) includes one or more data records which represent the geographic features encompassed within a separate one of the plurality of rectangles 219 (as shown in FIG. 4).

Figure 5:
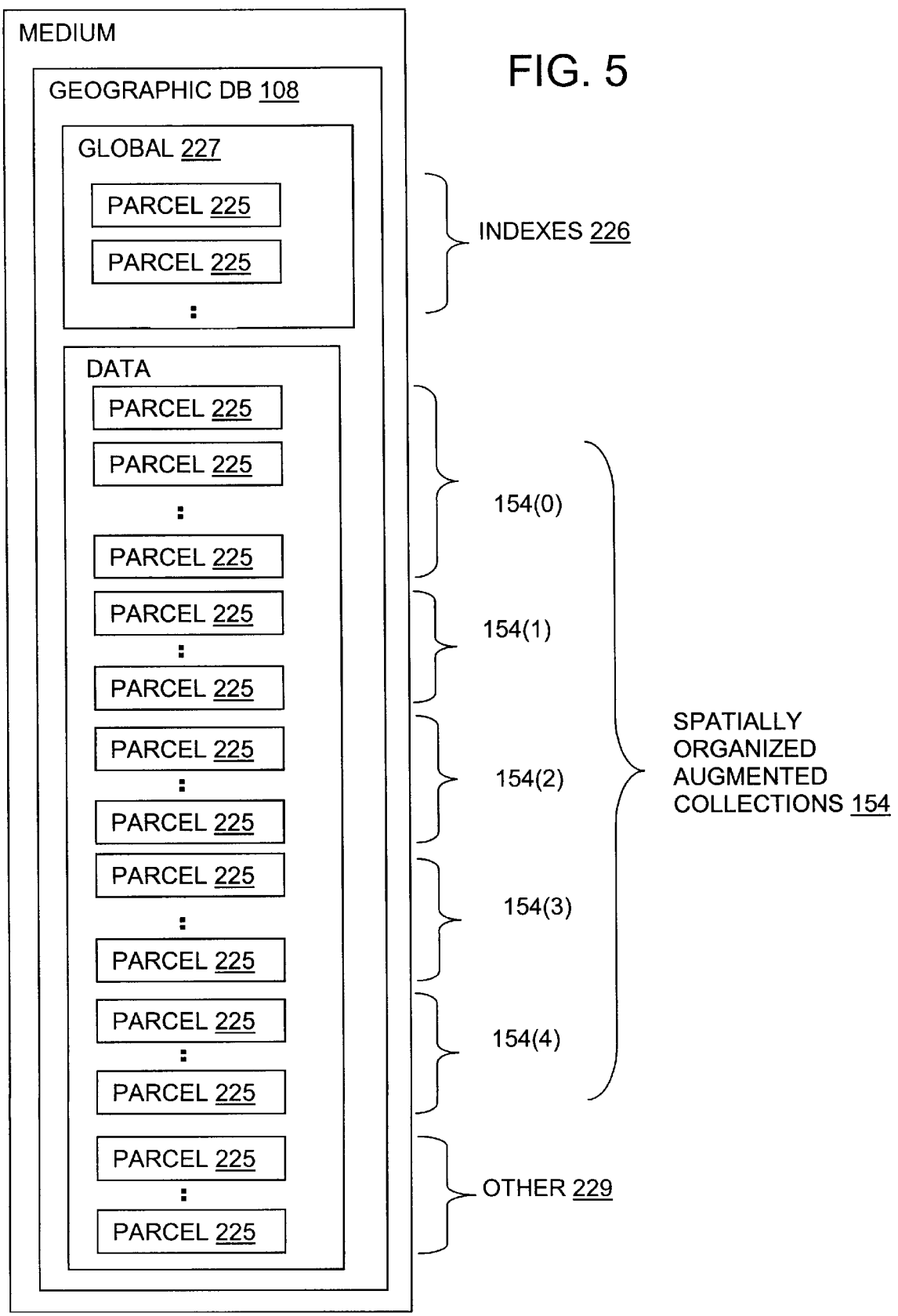
FIG. 5 is a block diagram illustrating the arrangement of geographic data according to the process of FIG. 2.

As shown in FIG. 5, the parcel 225 is then stored to form the database 108 so that the data in each parcel 225 are logically and/or physically grouped together. The parcel may represent the quantity of data that is accessed at the same time from the medium by the navigation system 105, and therefore when a parcel of data is accessed, all of its data records are read into the memory of the navigation system 105 at the same time. With reference to the map 211 of FIG. 4, this means that all the data records that represent the features encompassed within each rectangle 219 are accessed together as a group. It can be appreciated that for certain kinds of navigation functions, it is desirable to have in memory at the same time all the data records that represent features that are physically close together in the geographic region.

As the parcels 225 are formed for these types of data, the parcels are ordered. Various types of ordering may be used. In general, it is preferred that the parcels be ordered in a manner that minimizes searches for data. One way to order spatially organized parcels is to use a depth-first ordering from a kD-tree index within each type of data. This provides an ordering similar to Peano-key ordering. Parcels may be stored on a medium in this approximate Peano key order. This index is useful for initial location of an arbitrary position, such as when a program in a navigation system initially locates the data corresponding to a current vehicle position. As the parcels 225 are ordered, each may also be assigned a unique parcel identifier (e.g., a "parcel ID"). The parcel ID may be used to identify the parcel and/or its location on the medium.

As the parcels are ordered, one or more indexes 226 may also be formed using the kD-tree. These indexes 226 may be stored in a global portion 227 of the geographic database 108.

Referring to FIG. 2, in the step 156 in which the augmented collections 154 of data are organized spatially, each separate collection 154 is organized spatially separately. That is, the collection 154(0) is organized so that the data entities in contained in the collection that represent geographic features that are close together are located close together in the database. Then, the data entities in the collection 154(1) are organized so that data entities that represent geographic features that are close together are located close together in the database, and so on. These separate collections 154(0), 154(1), etc., are shown in FIG. 5.

After the separate augmented collections 154 are spatially organized, the spatially organized augmented collections are stored to form the database 108 (Step 158). The database can be used to distribute geographic information to separate navigation system units as explained below.

The process 118 shown in FIG. 1 for forming a geographic database that can be used for providing navigation-related and map-related data to end users may include additional steps and processes. As stated above, the data in the geographic database 108 may be organized into separate types to perform known navigation-related and map-related functions. Also, data may be organized to facilitate the functions remotely (e.g., on the navigation server 110) and the performance of other functions locally (e.g., on the end user's computing platform). Thus, the geographic database 108 may include other types of data 229 in addition to the data contained in the augmented collections 154.

III. THE NAVIGATION SYSTEM

Figure 6:
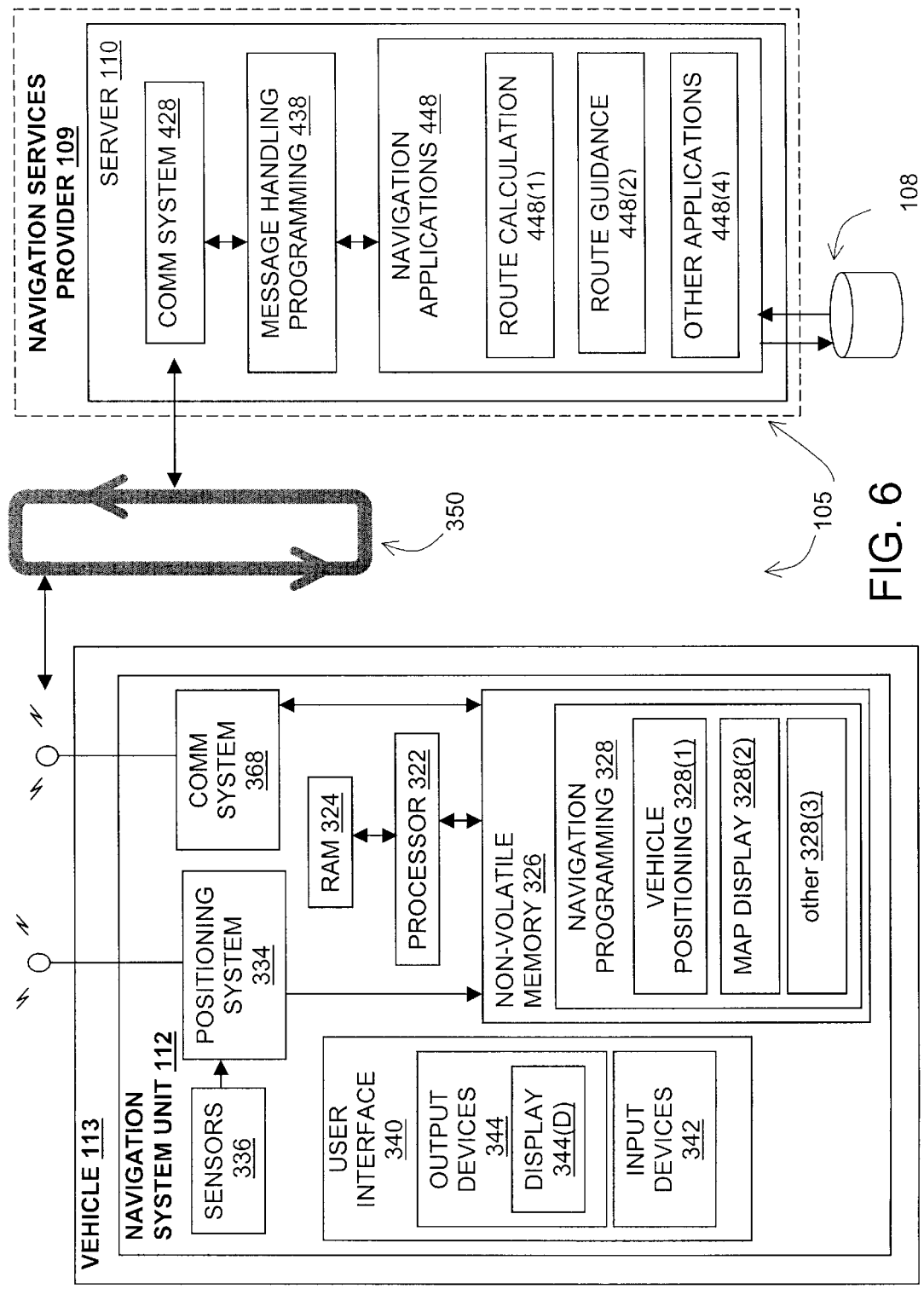
FIG. 6 is a block diagram of a navigation system unit installed in one of the vehicles in FIG. 1.

FIG. 6 shows components of the navigation system unit 112 installed on one of the vehicles 113 in FIG. 1. The navigation system unit 112 in FIG. 6 is exemplary of the navigation system units installed in some or all of the vehicles 113 in FIG. 1, i.e., the navigation system units in the other vehicles 113 include identical or similar components.

In FIG. 6, the navigation system unit 112 is comprised of hardware and software components. The hardware and software components operate together to provide navigation-related features to an end user (e.g., the driver and/or passengers). The navigation system unit 112 includes a processor 322, memory 324 and a non-volatile memory storage device 326 for storing navigation system programming 328 (software, firmware, data, etc.) for operating the navigation system unit, as well as data, such as configuration parameters. The navigation applications 328 may include a vehicle positioning application 328(1), a map display application 328(2), as well as other applications 328(3). The vehicle positioning application 328(1) determines the vehicle's position relative to data that represent the road network (e.g., map matching). The map display application 328(2) uses data that represent the road network to render an image of a map showing the area around the vehicle on a display panel 344.

In the embodiment of FIG. 6, the navigation system unit 112 includes a positioning system component 334. The positioning system component 334 may use GPS-type technology, a dead reckoning-type system, or combinations of these, or other systems, all of which are known in the art. The positioning system component 334 may include suitable sensing devices 336 that measure the speed, direction, angular acceleration, and so on, of the vehicle. The positioning system component 334 may also include appropriate technology to obtain a GPS signal, in a known manner. The positioning system component 334 provides an output that is used to determine the location, direction, travel distance, speed, etc., of the navigation system unit 112, and hence the vehicle 113 in which the navigation system is located.

The navigation system unit 112 also includes a user interface 340. The user interface 340 includes appropriate equipment 342 that allows the end user to input information into the navigation system. This input information may include a request to use the navigation features of the navigation system. For example, the input information may include a request for a route to a desired destination. The equipment used to input information into the navigation system may include a keypad, a keyboard, a microphone, etc., as well as appropriate software, such as a voice recognition program. The user interface 340 also includes suitable equipment 344 that provides information back to the end-user. This equipment 344 may include a display 344(D), speakers, or other means.

The navigation system 112 in the vehicle 113 is of the type that obtains some or all the geographic data needed to provide navigation-related or map-related services from the remotely located navigation services provider 109. The navigation system unit 112 and the navigation services provider 109 communicate with each other over a data network 350. The data network 350 may use any suitable technology and/or protocols that are currently available, as well as protocols that become available in the future. For example, the data network may use WAP, TCP/IP, etc. More than one protocol may be used in the data network 350 provided that appropriate conversion is used.

Referring to FIGS. 1 and 6, at least a portion of the network 350 includes a wireless portion 352. The wireless portion 352 of the data network 350 enables two-way communication between the navigation system 112 and the service provider 109 while the vehicle 113 is located anywhere in the region 100. The wireless portion 352 may be implemented by any suitable form of wireless communications, including cellular, PCS, satellite, FM, radio, or technologies that may be developed in the future. The wireless portion 352 may include one or more transmitters 356, such as a transponder tower, an antenna tower, an FM tower, satellites, or other suitable means. The transmitters 356 include an appropriate communication link 358 to the service provider 109. This link 358 may be land-based or may be wireless. The transmitters 356 include suitable technology that enables two-way communication between the service provider 109 and the navigation system unit 112 in the vehicle 113.

In FIG. 1, the navigation system units 112 in the other vehicles 113 in the region 100 that are serviced by the service provider 109 may also communicate with the service provider 109 over the data network 350. The other vehicles 113 in the region 100 that are serviced by the service provider 109 may also use the same means of wireless communication 352 to communicate over the data network 350 with the service provider 109. Alternatively, other vehicles 113 that are serviced by the service provider 109 may use other means of wireless communication to connect to the data network 350 and/or communicate with the service provider 109.

Referring to FIG. 6, the navigation system 112 in the vehicle 113 includes a communications system 368. The communications system 368 includes the appropriate hardware and software to send and receive data messages over the data network 350. The communications system 368 is operatively coupled to other components of the navigation system 112 so that messages can be sent from and received by the navigation system.

The navigation services provider 109 includes appropriate hardware and software for providing navigation services to the navigation systems in the vehicles 113. As mentioned above, the navigation services provider 109 may include the server 110 that includes or is associated with appropriate communications equipment 428 for receiving messages from the navigation system units 112 in the vehicles 113 and sending messages back to the navigation system units. The navigation services provider 109 also includes message handling programming 438 that analyzes the requests for navigation-related or map-related information received from the navigation system units 112, determines appropriate responses to the requests, and sends the responses to navigation system units 112 that sent the requests. The message handling programming 438 may include navigation application programs 448 to perform requested navigation-related and map-related functions. For example, the navigation applications 448 may include a route calculation application 448(1), a route guidance program 448(2), as well as other programs and applications 448(4).

In order to determine appropriate responses to the requests for navigation-related and map-related information, the navigation services provider 109 uses data from the geographic database 108. In the embodiment of FIGS. 1 and 6, the geographic database 108 used by the navigation services provider 109 is stored on appropriate storage media, e.g., one or more hard drives.

IV. OPERATION

As stated above, end users can obtain various navigation-related and map-related features using the navigation system 105 of FIG. 1. With the system of FIG. 1, geographic data are sent from the navigation services provider 109 to the end users' computing platforms, as needed, so that sufficient data are present on the end users' computing platforms in order to perform desired functions.

As an example, if the end user is following a calculated route to a destination, sufficient data are sent from the navigation services provider 109 to the end user's computing platform (such as the navigation system unit 112 shown in FIG. 6) so that driving instructions for following the calculated route can be provided to the end user. In some embodiments, the driving instructions are provided as the locations of certain required driving maneuvers are being approached. In order to provide driving instructions at these locations, the end user's computing platform is required to have data from which the end user's current position relative to data in the calculated route can be determined.

According to another example, if the end user's computing platform includes a graphical display (such as the display 344(D) in FIG. 6), sufficient data are sent from the navigation services provider 109 to the end user's computing platform so that a map of the end user's current location can be rendered on the graphical display of the end user's computing platform. According to some embodiments, sufficient data are sent so that maps of various scales can be rendered on the display of the end user's computing platform. Maps of the end user's current location can be provided whether or not the end user is following a calculated route.

When the geographic data are sent to the end user's computing platform to perform these types of functions, it is preferable that data about roads around the end user's current location are provided. These data are necessary if a graphical map of the end user's position is to be rendered on the display of the end user's computing platform. In addition, if the end user departs from a calculated route, the end user's computing platform should have sufficient data available locally so that the end user's position along a road can be determined.

According to one embodiment, as the end user travels along roads in the geographic region, the end user receives data that represent roads around the end user's current position that have the same rank as the road upon which the end user is traveling as well as data that represent roads of other ranks that are accessible from the roads of the same rank up to a threshold. The end user does not receive data that represent roads having ranks other than the rank of the road upon which the end user is traveling that are not accessible from roads having the same rank as the road upon which the end user is traveling.

This method of sending needed data from a remote database to the end user's computing platform can be used whether or not the end user is following a route calculated by the navigation system. Even if the end user is not following a route calculated by the navigation system, the end user may wish to have a graphical map of the roads around his/her current location displayed on a display screen of his/her computing platform. By sending data that represent roads of the same rank as the road upon which the end user is traveling along with data that represent roads of other ranks that are accessible within a threshold of these same rank roads, a graphical map can be displayed on the end user's computing platform that will show all the roads that the end user can reach from his/her current position. In a similar way, if the end user is following a calculated route, the end user may want to have a graphical map that shows not only the roads that are part of the route, but also roads that are not part of the route but that can be accessed from the route. The end user may wish to observe these roads that are not part of the route as they are being passed to confirm that he/she is following the route.

The present embodiment provides an advantage when the end user is following a calculated route. If the end user departs from the calculated route, intentionally or otherwise, the end user's computing platform has sufficient data available locally so that the end user's position along the off-route road segment can be determined. The information identifying the end user's position along the off-route road segment can be transmitted back to the navigation services provider and used to calculate a new route. The new route can be a new route to the destination, a route back to the old route, or a new route to a new destination.

A method of operation of the navigation system of the present embodiment is described in connection with FIG. 7. A process 500 includes steps performed by the end user's local computing platform (e.g., the navigation system unit 112) and another process 504 includes steps performed on the server I 10 of the navigation services provider 109.

The process 500 performed on the end user's computing platform may be one of several different processes that are performed on the end user's computing platform. For example, there may be another process wherein the end user's computing platform formulates a request for route guidance to a desired destination. The end user's computing platform may perform another process after it receives data indicating a route calculated to the desired destination. For example, after the end user's computing platform receives data indicating the route to a desired destination, the end user may be provided with instructions for following the route. Likewise, the navigation server may perform processes in addition to the process 504 shown in FIG. 7. For example, upon receiving a request from an end user's computing platform, the navigation server may calculate a route to an indicated destination. The navigation selver may also formulate driving instructions for following the route.

Referring to the process 500 in FIG. 7, as the end user travels along roads in the geographic region, the end user's computing platform determines its position (Step 510). The position may indicate on which road segment the end user is currently located. This function may be performed by the vehicle positioning application (328(l) in FIG. 6) located in the end user's computing platform. In order to determine on which road segment the end user is currently located, the vehicle positioning application in the end user's computing platform may use geographic data that have previously been received from the navigation services provider 109.

When the end user's computing platform performs the step 510 of determining its position, the end user may have been receiving driving instructions from the computing platform for following a route to a destination. The route may have been calculated by the navigation server and data indicating the route downloaded to the end user's computing platform. Alternatively, when the end user's computing platform performs the step of determining its position, the end user may not be receiving driving instructions for following a route to a destination.

Referring again to FIG. 7, after the end user's computing platform determines a current position of the end user's vehicle, a message 512 is formed (Step 514). The message 512 includes data indicating the vehicle's position. The message may also include data indicating the rank of the road upon which the vehicle is located and the direction of travel of the vehicle along the road segment upon which the vehicle is located. The rank of the road segment may be determined from the data that have previously been received from the navigation services provider 109. The vehicle direction may be determined from the sensors (336 in FIG. 6). The message 512 may include additional information.

After the end user's computing platform forms the message 512, the message 512 is sent to the navigation server 110 (Step 518). The message 512 is sent using the network (350 in FIGS. 1 and 6).

The message 512 that is sent from the end user's computing platform is received on the navigation server 110 (Step 522). The navigation server 110 obtains data 526 to send to the end user's computing platform (Step 524). The data 526 obtained by the navigation server 110 represent some of the roads located around the end user's current position (as indicated by the data included in the message 512 sent by the end user). The data 526 obtained by the navigation server 110 includes data representing the roads located around the end user's current position that have the same rank as the road upon which the end user is traveling. The rank of the road upon which the end user is traveling can be determined from the message 512 received by the navigation server 110 from the end user. The data 526 obtained by the navigation server also includes data representing portions of some of the roads located around the end user's current position that have a rank other than the rank of the road upon which the end user is traveling. These portions of roads of other ranks include portions that are accessible from the roads around the end user's position that have the same rank as the road upon which the end user is traveling. The portions of roads of other ranks include those portions of such roads that are accessible up to a distance associated with a predefined driving time of the threshold parameter. The navigation server 110 may use the data indicating the vehicle's direction that had been included in the message 512 to obtain more data representing roads located ahead of the vehicle than data representing roads located behind the vehicle.

The navigation server 110 may use the database 108 formed according to the process described in FIG. 2 to obtain the data 526. The database 108 includes data organized into augmented collections based upon the rank of the represented road segment. By using the database formed according to the process of FIG. 2, the navigation services server does not have to calculate which road segments are accessible from the end user's current position each time data are sent to the end user's computing platform. This facilitates sending data to the end user's computing platform quickly.

After the navigation server 110 obtains the data 526 relating to some of the roads around the end user's location, the navigation server 110 sends the data 526 to the end user's computing platform (Step 530). When the navigation server sends data to the end user's computing platform, the data may be sent in uniform-sized packets. For example, each packet may have a size of 16 K, 32 K, 64 K, etc. Each packet may correspond to a spatially-organized parcel, such as one of the parcels 225 in FIG. 5. Using uniform-sized packets may facilitate processing of the data both at the navigation services provider and at the end user's computing platform.

The end user's computing platform receives the data 526 sent by the navigation server 110 relating to some of the roads located around the current position of the vehicle (Step 540). The end user's computing platform uses the data 526 sent by the navigation server 110 in a navigation application located on the end user's computing platform (Step 544).

For example, the end user's computing platform may use the data 526 in the vehicle positioning application 328(1) and the map display application 328(2).

As stated above, data that represent roads of ranks other than the rank of the road upon which the end user is traveling up to a distance related to a driving time threshold are sent to the end user's computing platform. The driving time threshold is selected so that the end user's computing platform has sufficient data so that regardless of which way the end user travels, the end user's computing platform has data that represent the road upon which the end user is located. The driving time threshold may be related to the responsiveness of the navigation services server and the associated network delays which determine how quickly the end user's computing platform can receive data updates from the navigation services server. As an example, if new data are received from the navigation services server by the end user's computing platform within 30 seconds after a data request, then the driving time threshold is selected so that all the road segments within at least a 30 second driving time distance to a connection to a road of the rank of road that the end user's position is currently on are sent to the end user's computing platform. A 40 second driving time threshold may be selected so that the end user has data for at least 30 seconds of driving time available locally in the vehicle.

Referring back to the step 510 in FIG. 7 in which the end user's computing platform determines the end user's position, if the end user's computing platform does not have data from the navigation services provider from which the road segment upon which the end user is currently located can be determined, the end user's computing platform may send other kinds of data to the navigation services provider from which the end user's location can be determined. For example, if the end user's computing platform does not have data from which the road segment upon which the end user is currently located can be determined, the end user's computing platform may send data indicating the geographic coordinates of the end user's computing platform. These data indicating the geographic coordinates of the end user's computing platform may be obtained from a GPS system associated with the end user's computing platform. The navigation services provider uses the data indicating the geographic coordinates of the end user's computing platform to determine upon which road segment the end user is located. The navigation services provider may have a vehicle positioning application, similar to the vehicle positioning application in the end user's computing platform, for this purpose.

Figure 8:
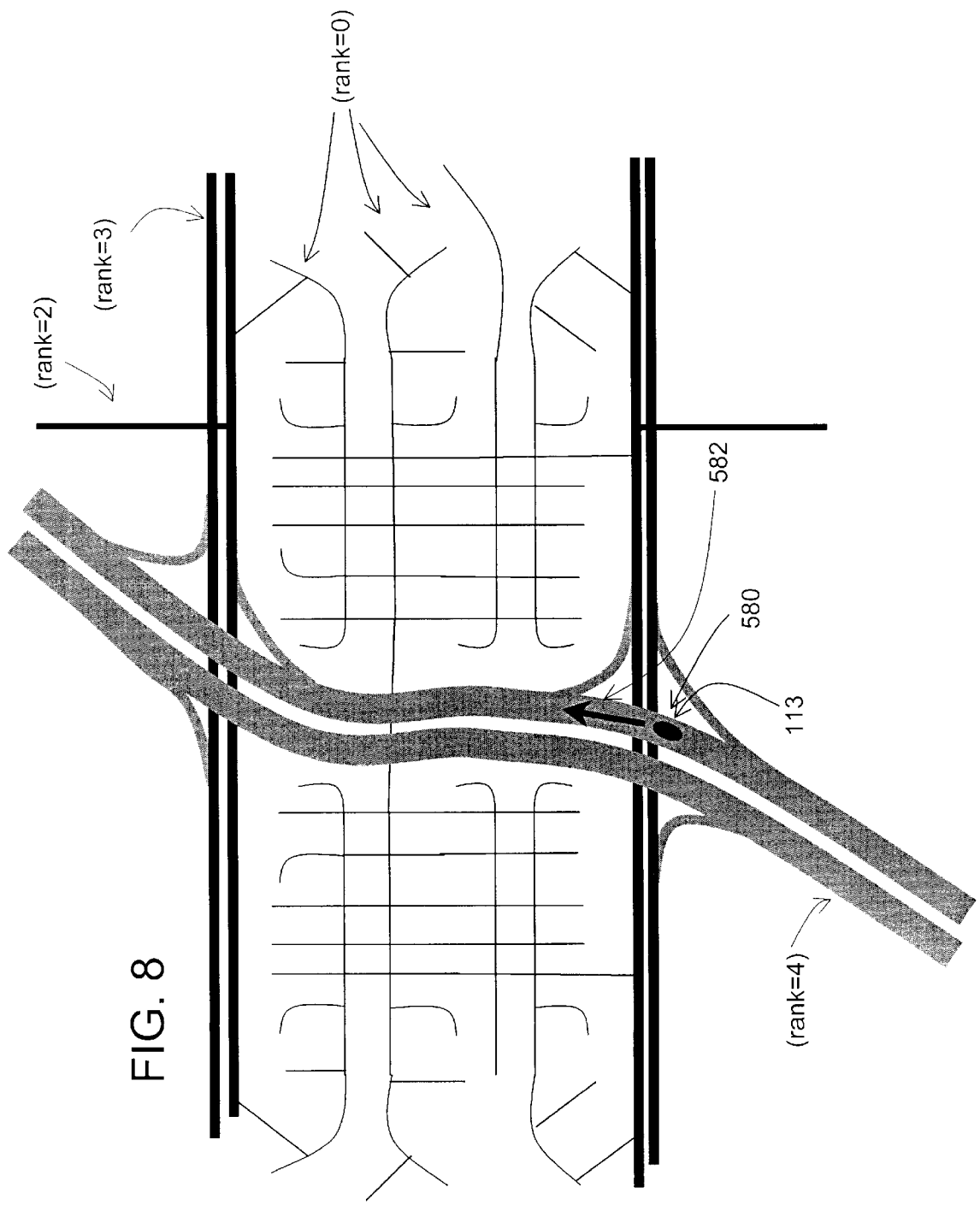
FIG. 8 is an illustration of the actual road network located around the navigation system unit of FIG. 6 when the vehicle in which the navigation system is located is at a first position along the roads of the road network.
Figure 9:
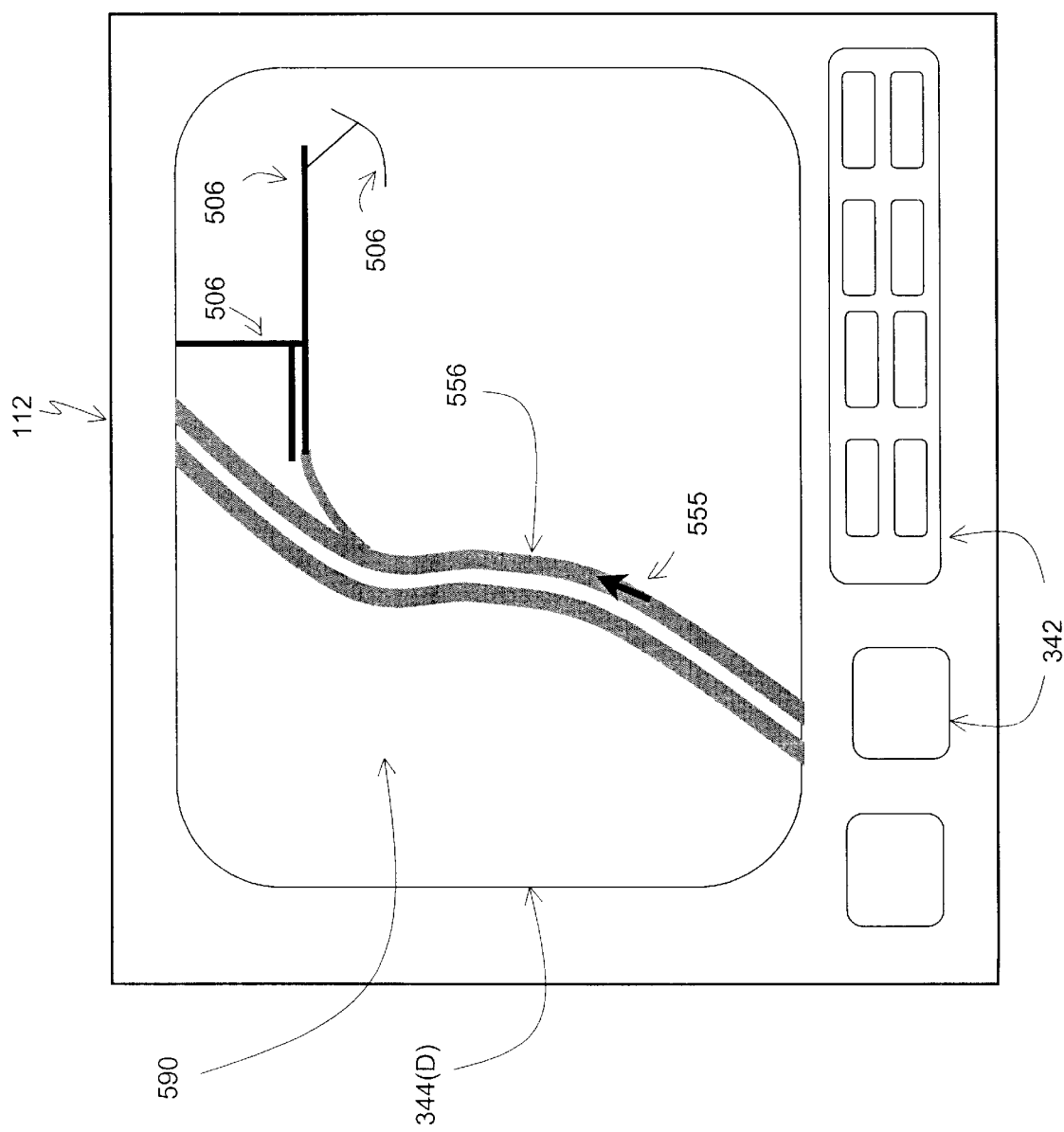
FIG. 9 shows the display panel of the navigation system unit when the vehicle in which the navigation system unit is located is at the position shown in FIG. 8.

FIGS. 8 and 9 show how the present embodiment can be used to show an end user a map of his/her current location as well as some of the roads located around the end user. FIG. 8 is a map of illustrating the actual road network around the end user's current location. As shown in FIG. 8, the end user's vehicle 113 (which includes the navigation system unit 112) is located at a position 580 along a rank 4 road segment. The vehicle is traveling in the direction indicated by the arrow 582. FIG. 9 shows the display panel 344(D) of the navigation system unit 112. A graphical image 590 of a map of the end user's position is shown on the display panel 344(D). The image 590 may be rendered using the map display application 328(2) in the navigation system unit 112. The map display application 328(2) uses data representing some of the roads located around the vehicle's current location. The data were obtained from the central database 108 associated with the navigation server 110 according to the process shown in FIG. 7. Note that the graphical image 590 in FIG. 9 includes roads of the same rank as the road upon which the end user is traveling and portions of roads of other ranks that are accessible from these roads up to a threshold, but does not include portions of roads of other ranks that are beyond the threshold.

Figure 10:
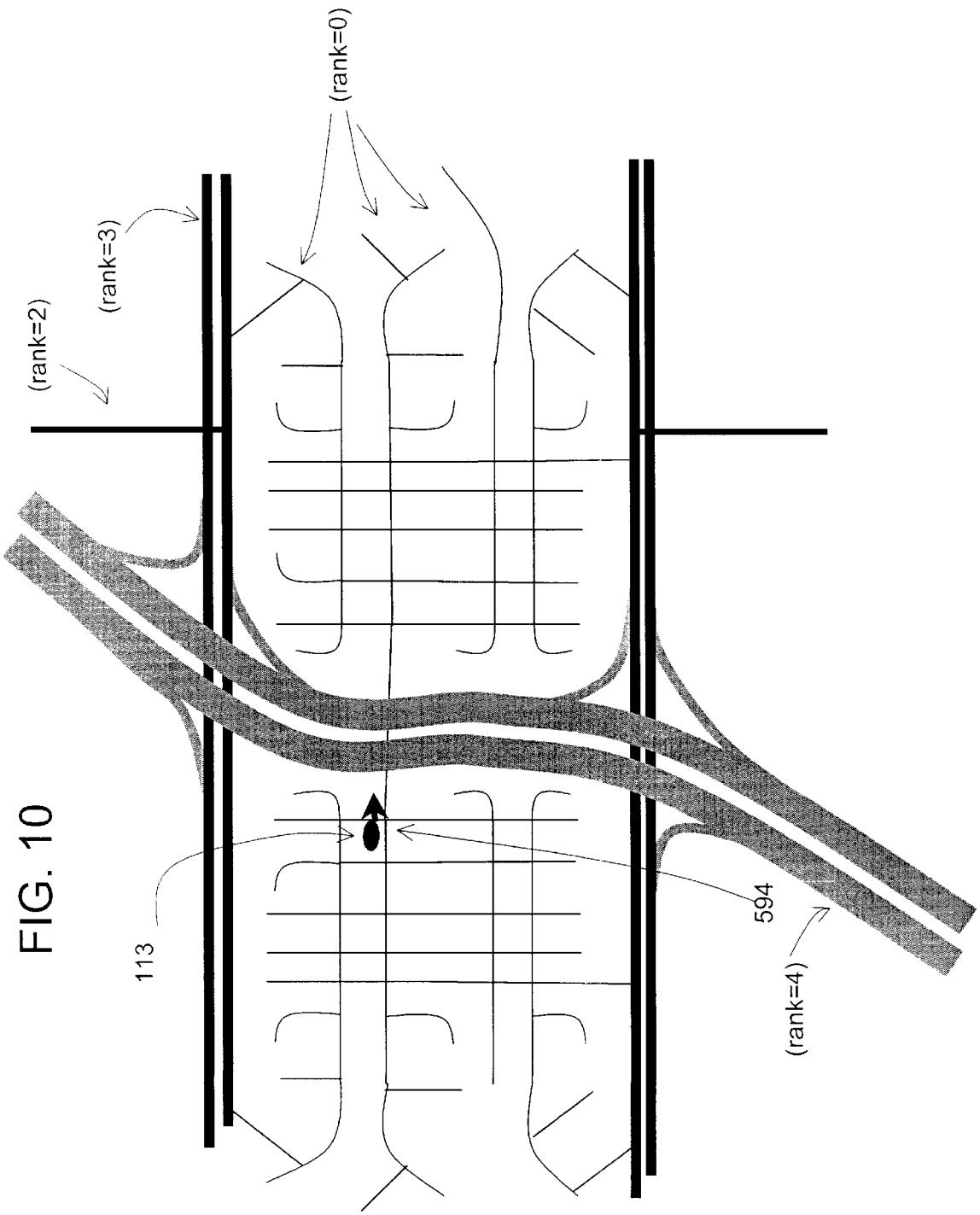
FIG. 10 is an illustration of the actual road network located around the navigation system unit of FIG. 6 when the vehicle in which the navigation system is located is at a second position along the roads of the road network.
Figure 11:
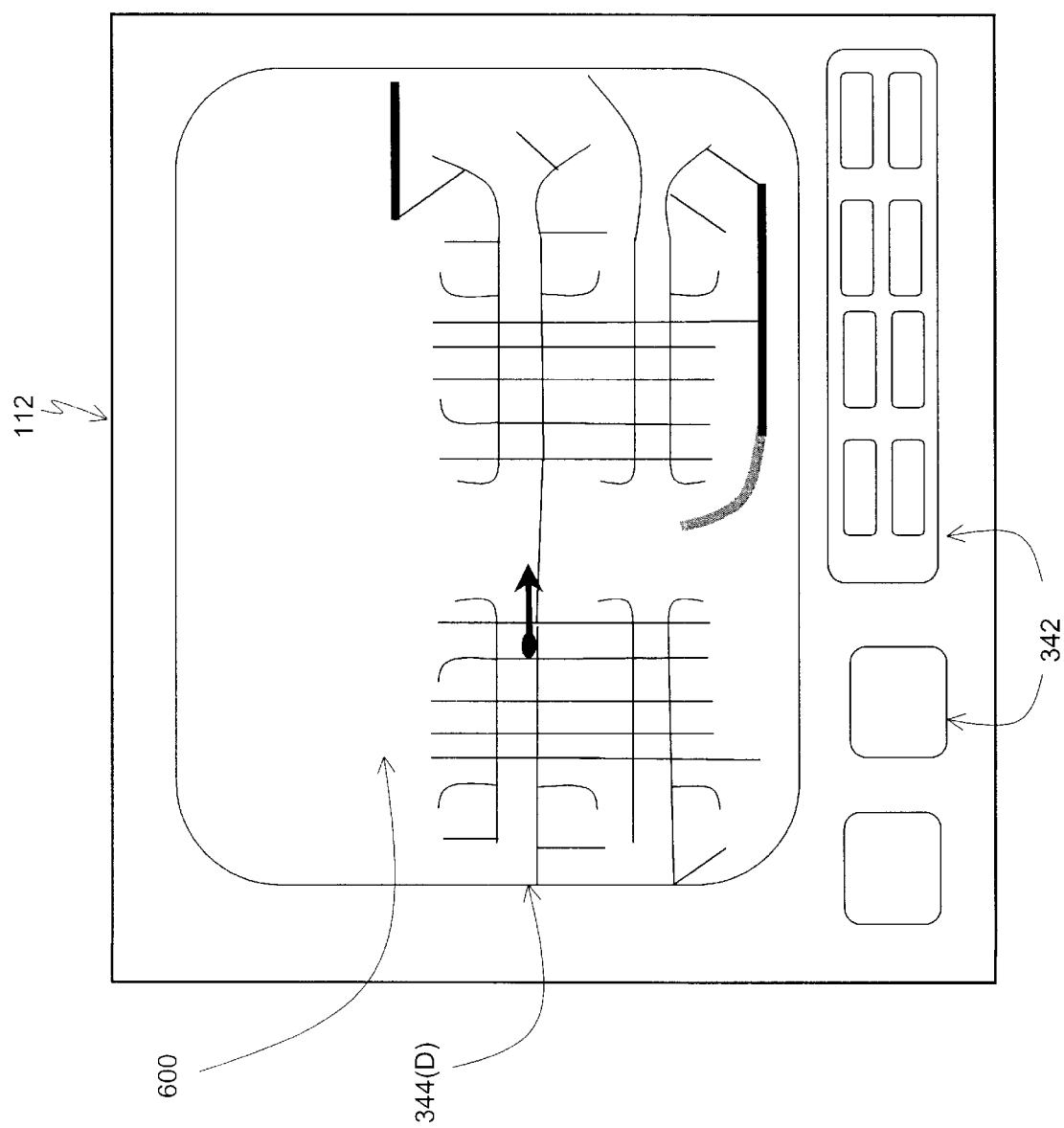
FIG. 11 shows the display panel of the navigation system unit when the vehicle in which the navigation system unit is located is at the position shown in FIG. 10.

FIGS. 10 and 11 further illustrate operation of the present embodiment. FIG. 10 shows the same road network shown in FIG. 8. However, in FIG. 10, the vehicle is at a different location 594. The location 594 is on a rank 0 road segment. FIG. 11 shows the display panel 344(D) with a graphical image 600 of a map of the end user's position. The image 600 includes roads of the same rank as the road upon which the end user is traveling and portions of roads of other ranks that are accessible from these roads up to a threshold, but does not include portions of roads of other ranks that are beyond the threshold.

The present embodiment provides several advantages. By sending the end user data that represent roads of the same rank around the end user's current location and data that represent roads of other ranks that are accessible from these roads up to a driving time threshold, the end user should have enough data available locally at all times so that the end user cannot reach a road which is not represented by data already available locally on the end user's computing platform. Thus, the end user should have the data available locally at all times that are necessary to determine upon which road segment the end user is located. Before the end user can travel beyond the area covered by the data available locally, new data are received from the remotely located geographic database.

An advantage follows from not sending data that represent roads of other ranks that are not accessible from the end user's current position. Since these roads are not accessible from the end user's current position, the end user cannot travel onto these roads and therefore it is not necessary that the end user receive data that represent these roads. By not sending data that that represent these inaccessible roads, the available bandwidth of the communications network used by the navigation system can be used efficiently, i.e., more pertinent data can be sent.

V. ALTERNATIVES

As stated above, the disclosed navigation system includes a central geographic database from which end users can obtain geographic data and other navigation-related and map-related services using a variety of different computing platforms. Thus, the navigation system can be used by end users who access the geographic database using personal computers, networks, personal digital assistants, portable electronic devices, and so on. Some of these computing platforms may be portable or mobile and others of these computing platforms may not be portable or mobile.

These various computing platforms may provide various means by which navigation-related and map related information is provided back to the end user. For example, navigation system units in vehicles, personal computers, and personal organizers may have display screens on which the navigation-related and map-related information may be shown to the end user. Some computing platforms may not have a display screen. Computing platforms without display screens may provide navigation-related and map-related information to the end user audibly. Some computing platforms may provide navigation-related and map-related information both visually and audibly.

In some of the embodiments described above, it was indicated that some of the end users' computing platforms included positioning systems by which the location of the computing platform could be determined. Positioning system may include GPS receivers, dead-reckoning equipment, etc., that can determine the instantaneous position of the end user. Alternatively, the location of some of the computing platforms can be determined remotely using technologies like those used for determining locations of cellular phones in an area. There are various available technologies that provide this feature, e.g., cell triangulation. Some of the companies that provide this type of technology include ArrayComm, Inc., Harris Corporation, Corsair Communications, Lockheed Martin Corporation, CELLTRAX, Inc., TruePosition, Inc., Cell-Loc Inc., KSI Inc., and U.S. Wireless Corporation. Some of these technologies can be used to locate a cellular phone user who dials an emergency number, e.g., "911." Any such technology that is presently available or that becomes available in the future may be used to determine an end user's position.

As mentioned above, a threshold parameter is selected for the geographic database when determining to what extent roads of other ranks are included in collections of data that represent road segments of a given rank. In an alternative embodiment, multiple versions of the geographic database 108 can be formed, each using a different threshold parameter. For example, one geographic database can be formed with a threshold parameter of 20 seconds, another geographic database can be formed with a threshold parameter of 40 seconds, a third geographic database can be formed with a threshold parameters of 60 seconds. These different databases can be used by a single geographic database provider. The different databases can be used to provide different levels of service. For example, a standard level of service provides data in response to an update request within 50 seconds. To provide this level of service, the geographic database formed with a threshold parameter of 60 seconds is used. For end users who select a higher level of service, updated data are provided every 30 seconds. To provide this level of service, the geographic database formed with a threshold parameter of 40 seconds is used. For end users who select a highest level of service, updated data are provided every 10 seconds. To provide this level of service, the geographic database formed with a threshold parameter of 20 seconds is used. A navigation service provider may also use databases formed with different threshold parameters to accommodate different demand loads. For example, when a large number of end users are accessing the navigation server to obtain navigation-related and map-related data, the amount of time between successive downloads of data to each user may increase. When this occurs, the navigation server may automatically switch to using a geographic database formed with a greater threshold.

Some roads and intersections represented in a geographic region may have time of day restrictions. For example, at some intersections, left turns are prohibited during certain hours, e.g., between 4:00 PM and 6:00 PM. According to another example, parking may be prohibited along a road between certain hours, e.g., between 6:00 AM and 9:00 AM. Data indicating time of day restrictions may be included in the geographic database. These data indicating time of day restrictions may be used by the navigation system when calculating a route so that the end user is not advised to make a turn that is illegal at a certain time of day. Therefore, these time of day restrictions affect whether certain road segments are accessible from other road segments. As described above in connection with FIG. 2, when forming the geographic database 108, road segments that are accessible within a threshold of roads of a given rank are included in an augmented collection 154. According to one embodiment, time of day restrictions are ignored when performing the step 152 of forming the augmented collections. If time of day restrictions are ignored when forming the augmented collections 154, data representing some road segments that are inaccessible during certain times of day would be included in the augmented collection. However, the number of such road segments may be relatively small. Therefore, the amount of data represented by such road segments would not significantly affect the amount of data transmitted to the end users' computing platforms from the central geographic database. According to an alternative embodiment, separate geographic databases can be formed to take into account time of day restrictions. According to this alternative embodiment, separate databases would be formed for different times of the day. A 600 AM version of the database would be formed using the time of day restrictions that apply at 600 AM, 900 AM version of the database would be formed using the time of day restrictions that apply at 900 AM, and so on. Then, the navigation server would use the appropriate version of the database corresponding to the time of day to send data to the end users' computing platforms.

A further alternative embodiment would be for the navigation server to remove the inaccessible segments at the time it prepares to send the data out to the navigation unit. When the data are being prepared for transmission to the navigation computer, the navigation server will determine which links are accessible and which are not. The links with a time-of-day restrictions may be included in the databases with special attributes to make the filtering process more efficient.

In FIG. 2 and the description associated therewith, a method for forming a type of layered database is disclosed. There are different ways that the data can be organized. The processes 500 and 502 in FIG. 7 for sending data from a central database for use locally in end users' computing platforms are not limited to use of a geographic database formed according to the process of FIG. 2. For example, in an alternative embodiment of a layered database, a lowest layer can include data representing road segments of all ranks, a next higher layer would include data representing only road segments of rank 1 and higher, and so on, until a highest layer includes data representing only roads of the highest rank. According to another embodiment, the geographic database used by the navigation services provider may implement logical layering. With logical layering, instead of forming actual separate physical collections of data for each layer (e.g., collections 140 and 156 in FIG. 2), data representing roads of all ranks are included in a single collection and the data representing roads of certain ranks are suppressed, as necessary, when the data are accessed to emulate the function of having actual physical layers.

Figure 12:
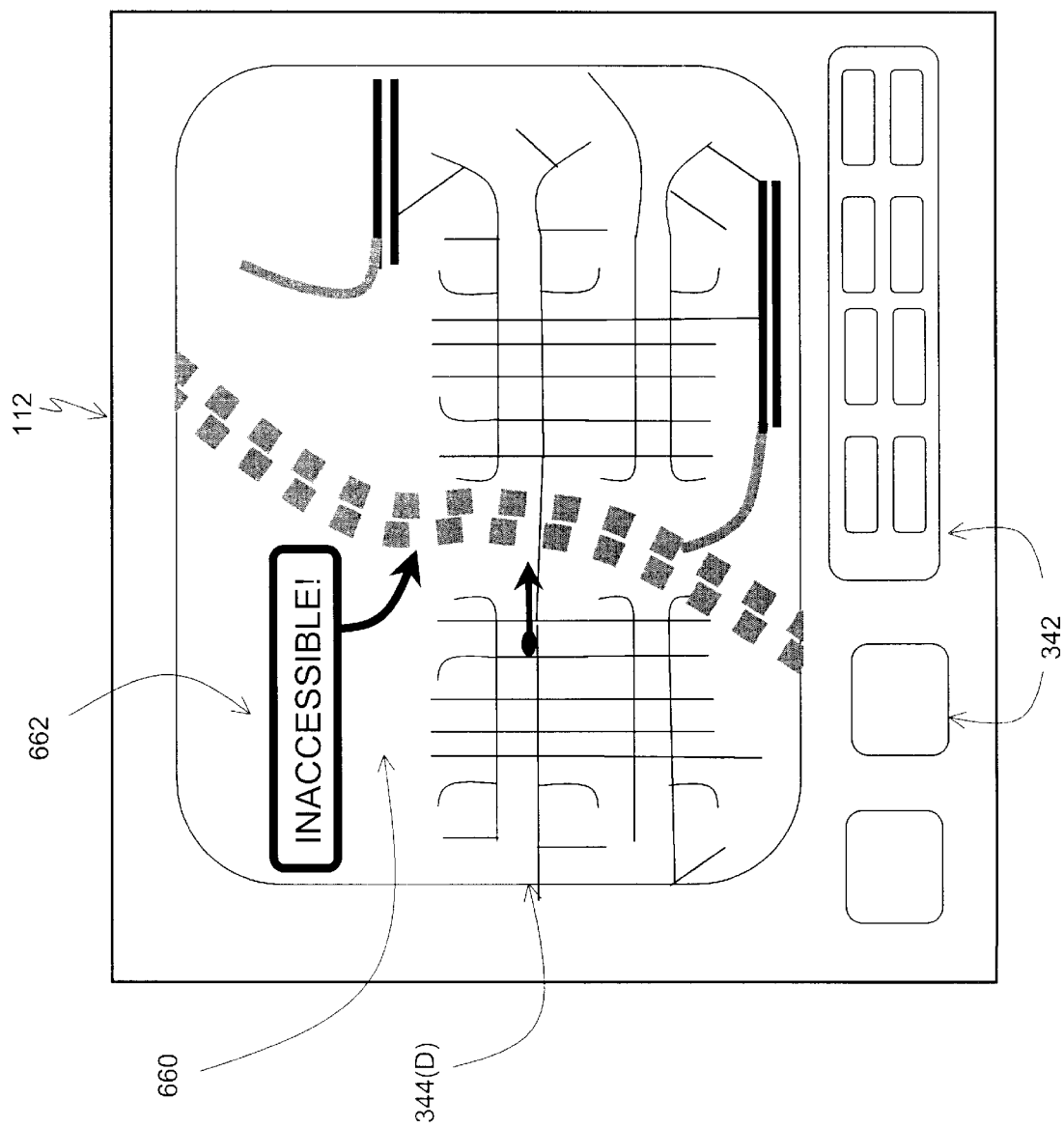
FIG. 12 is similar to FIG. 11 and illustrates the display panel of the navigation system according to an alternative embodiment when the vehicle in which the navigation system unit is located is at the position shown in FIG. 10.

In FIG. 11, the display screen of the end user's computing platform shows the roads around the end user that have the same rank as the road upon which the end user is located and roads of other ranks that are accessible from the roads of the same rank. As shown in FIG. 10, a rank 4 road passes over the rank 0 road upon which the end user is located immediately ahead of the end user's position. Comparing FIG. 11 to FIG. 10, it is noted that this rank 4 road is not shown in on the display screen because it is neither of the same rank as the road upon which the end user is located nor accessible from the rank 0 roads. Even though the end user cannot access the rank 4 road, it may be helpful to the end user to know that the rank 4 road forms an overpass over the road upon which he/she is located. Therefore, according to an alternative embodiment, non-accessible roads may be shown on the end user's display screen if showing the roads would be useful to the end user. FIG. 12 shows the display panel of an end user's navigation system unit that operates according to this alternative embodiment. FIG. 12 is similar to FIG. 11 and illustrates the display panel of the navigation system when the vehicle in which the navigation system unit is located is at the position shown in FIG. 10. In FIG. 12, the display screen 344(D) shows an image 660 of the roads around the end user including the inaccessible rank 4 oad. The image 660 includes an indication 662 that the rank 4 oad is inaccessible. The indication 662 may be a message. Alternatively, the inaccessible road may be in a different color, a different line style, or otherwise shown differently.

As stated above, in preferred embodiment the threshold parameter used to identify which road segments of ranks other than a the rank associated with a collection data is expressed as a driving time. In alternative embodiments the threshold parameter may be a driving distance to another value.

It is intended that the foregoing detailed description be regarded as illustrative rather than limiting and that it is understood that the following claims including all equivalents are intended to define the scope of the invention.

We claim:

1. In a navigation system in which geographic data are transmitted to an end user's computing platform and used by the end user's computing platform to provide navigation-related features to an end user as the end user travels along roads in a geographic region, an improved method comprising:
   determining a roadway portion on which the end user is located; and
   transmitting a first portion of data to the end user's computing platform, wherein the first portion of data include
   a. data that represent portions of roads located in proximity to the roadway portion upon which the end user is located and that have a same rank as the rank of the roadway portion upon which the end user is located, wherein a rank of a roadway portion corresponds to a classification of the road of which the roadway portion is a part such that roads having a higher rank are traversable generally faster and carry generally higher volumes of traffic than roads of a lesser rank; and
   b. data that represent portions of roads having ranks other than the rank of the roadway portion upon which the end user is located, wherein these portions of roads are accessible within a predetermined threshold by vehicles from the roads located in proximity to the roadway portion upon which the end user is located and that have the same rank as the roadway portion upon which the end user is located.

2. The method of claim 1 wherein the end user is located in a vehicle.

3. The method of claim 1 wherein the end user's computing platform comprises a navigation system unit in a vehicle.

4. The method of claim 1 wherein the end user's computing platform comprises a hand held personal organizer.

5. The method of claim 1 further comprising the step of:
   prior to transmitting the first portion of data, transmitting a message from the end user's computing platform, wherein the message indicates a location of the end user.

6. The method of claim 1 wherein the step of determining is performed in the end user's computing platform.

7. The method of claim 1 wherein the step of transmitting is performed at least in part over a wireless communications link.

8. The method of claim 1 wherein the predetermined threshold is related to a driving time between successive transmissions of data to the end user's computing platform.

9. The method of claim 1 wherein the predetermined threshold is related to a distance.

10. The method of claim 1 further comprising the step of:
    prior to the step of transmitting, accessing a database to obtain the first portion of data, wherein the database is organized into a plurality of separate collections of data wherein each collection of said plurality of separate collections includes data that represent all the roads of a respective separate given one of the plurality of ranks and data that represent roads of another of the plurality of ranks that are accessible from the roads of the respective given rank up to the predetermined threshold.

11. The method of claim 1 wherein the first portion of data does not include data that represent portions of roads having ranks other than the rank of the roadway portion upon which the end user is located that are not accessible within the predetermined threshold by vehicle from the roads located in proximity to the roadway portion upon which the end user is located.

12. The method of claim 1 further wherein the step of determining is performed remotely from the end user's computing platform.

13. The method of claim 1 wherein data are transmitted to the end user to guide the end user to a desired destination.

14. The method of claim 1 wherein the end user is not receiving data to guide the end user to a desired destination.

15. The method of claim 1 wherein a program on a central database logically suppresses data that represent portions of roads having ranks other than the rank of the roadway portion upon which the end user is located that are not accessible within the predetermined threshold by vehicle from the roads located in proximity to the roadway portion upon which the end user is located.

16. A method of operation of a navigation system comprising:
    determining the positions along roads in a geographic region of each of a plurality of end users' computing platforms as each of said plurality of end users' computing platforms travels along said roads; and
    for each of said positions for each of said end users' computing platforms, transmitting data that represent roads located around the position and that have a same rank as the road associated with the position and data that represent roads of ranks other than the rank of the road associated with the position but that are accessible from roads located around the position and that have a same rank as the road associated with the position, wherein a rank of a road corresponds to a classification such that roads having a higher rank are traversable generally faster and carry generally higher volumes of traffic than roads of lesser rank.

17. The method of claim 16 wherein the roadway portion on which the end user is located is determined on a central navigation server.

18. A method of operation of a navigation system comprising:
    on an end user's computing platform, receiving a succession of data transmissions from a central geographic database, wherein each of said successive data transmissions includes data that represent portions of roads that are located in proximity to a portion of road upon which the end user is located at a given time associated with the data transmission and that have a rank that is the same as the rank of the portion of road upon which the end user is located, wherein the rank of a portion of road corresponds to a classification of the road of which the portion of road is a part such that roads having a higher rank are generally traversable faster and carry generally higher volumes of traffic than roads of a lesser rank; and data that represent portions of roads that have ranks other than the rank of the portion of road upon which the end user is located and that are accessible within a predetermined threshold from the roads located in proximity to the portion of road upon which the end user is located that have the same rank as the portion of road upon which the end user is located; and using the data received in each of said succession of data transmissions to provide a navigation-related or map-related feature to the end user.

19. The method of claim 18 wherein the step of using comprises providing a graphical map image on a display screen of the end user's computing platform.

20. The method of claim 18 wherein the step of using comprises determining a current position of the end user's computing platform relative to data that represent the roads.

21. The method of claim 18 further comprising:
from the end user's computing platform, sending a series of messages that indicate positions of the end user's computing platform as the end user's computing platform travels along roads.

22. The method of claim 21 wherein each of said series of messages also includes data that indicate a rank of the road upon which the end user's computing platform is located.

23. The method of claim 21 wherein each of said series of messages also includes data that indicate a rank of the road upon which the end user's computing platform is located.

24. The method of claim 18 wherein the end user's computing platform receives sufficient data from the central geographic database so that if the end user's computing platform departs from following a calculated route, the portion of road upon which the end user's computing platform is located is represented by data already received by the end user's computing platform from the central geographic database.

25. The method of claim 18 wherein the predetermined threshold is related to a driving time.

26. The method of claim 18 wherein the predetermined threshold is related to a distance.

27. A navigation system comprising:
a plurality of end users' computing platforms each of which has a user interface;
a central geographic database having data that represent roads wherein the geographic database is organized into a plurality of collections of data wherein each collection includes data that represent roads of a corresponding separate one of a plurality ranks and data that represent roads of other ranks that are accessible within a predetermined threshold of said roads of the corresponding rank, wherein a rank of a road corresponds to a classification such that roads having a higher rank are generally traversable faster and carry generally higher volumes of traffic than roads of lesser rank; and
a navigation server that receives requests for navigation-related and map-related services from the plurality of users' computing platforms and uses the central geographic database to provide responses to said requests.

28. The invention of claim 27 further comprising a wireless communications link by which said plurality of end users' computing platforms receive said responses from the navigation server.

29. The invention of claim 27 wherein at least some of said end users' computing platforms include positioning systems by which the locations of the end users' computing platform can be determined.

30. The invention of claim 27 wherein at least some of said end users' computing platforms are navigation systems installed in vehicles.

31. The invention of claim 27 wherein at least some of said end users' computing platforms include display screens upon which images of roads located around the computing platform can be shown using data included in said responses.

32. The invention of claim 27 wherein said end users' computing platforms have sufficient data from the central database so that if said end users' computing platforms depart from calculated routes, said end users' computing platforms have data that represent the roads upon which the computing platforms are located.

33. The invention of claim 27 wherein the predetermined threshold is related to a driving time.

34. The invention of claim 27 wherein the predetermined threshold is related to a distance.

* * * * *